US008700028B2

(12) United States Patent
Harris et al.

(10) Patent No.: US 8,700,028 B2
(45) Date of Patent: Apr. 15, 2014

(54) DIAGNOSTIC MANAGEMENT SESSIONS IN A COMMUNICATION NETWORK

(75) Inventors: John M. Harris, Glenview, IL (US);
Matt J. Dillon, Greenwood Village, CO (US); Jerome O. Vogedes, Milwaukee, WI (US)

(73) Assignee: Motorola Solutions, Inc., Schaumburg, IL (US)

( * ) Notice: Subject to any disclaimer, the term of this patent is extended or adjusted under 35 U.S.C. 154(b) by 1074 days.

(21) Appl. No.: 12/372,974

(22) Filed: Feb. 18, 2009

(65) Prior Publication Data

US 2009/0233595 A1    Sep. 17, 2009

Related U.S. Application Data

(60) Provisional application No. 61/036,484, filed on Mar. 14, 2008.

(51) Int. Cl.
*H04W 24/00* (2009.01)
(52) U.S. Cl.
USPC ............ 455/425; 455/423; 455/419; 709/203
(58) Field of Classification Search
CPC .. H04W 24/00; H04L 67/306; H04L 12/2697
See application file for complete search history.

(56) References Cited

U.S. PATENT DOCUMENTS

| 5,859,838 | A | 1/1999 | Soliman |
| 6,088,588 | A | 7/2000 | Osborne |
| 6,445,917 | B1 | 9/2002 | Bark et al. |
| 7,003,290 | B1 | 2/2006 | Salonaho et al. |
| 2004/0097237 | A1 | 5/2004 | Aoyama |
| 2004/0152362 | A1 | 8/2004 | Carter et al. |
| 2005/0009547 | A1* | 1/2005 | Harris et al. ............... 455/509 |
| 2006/0010448 | A1* | 1/2006 | Sathe ......................... 718/102 |
| 2006/0023642 | A1* | 2/2006 | Roskowski et al. ......... 370/254 |
| 2008/0082620 | A1* | 4/2008 | Barsness .................... 709/207 |

OTHER PUBLICATIONS

OMA Open Mobile Alliance, DiagMon Management Object, Draft Version 1.0-28 Dec. 2007, Open Mobile Alliance, OMA-TS-DiagMonMO-V1_0-20071228-D, pp. 1-17.
OMA Open Mobile Alliance, DM DiagMon Architecture, Draft Version 1.0-11Oct. 2007, Open Mobile Alliance, OMA-AD-DM-DiagMon-V1_0-20071011-D, pp. 1-13.

* cited by examiner

*Primary Examiner* — Patrick Edouard
*Assistant Examiner* — Michael Irace (57) ABSTRACT

A system a method for managing diagnostic sessions in a communication network includes a first step (604) of determining presence information of at least one mobile station. A next step (610) includes estimating a usage probability of the at least one mobile station based on the presence information. A next step (614) includes implementing a Diagnostic Management session in response to the usage probability.

24 Claims, 6 Drawing Sheets

DIAGNOSTIC MANAGEMENT SESSIONS IN A COMMUNICATION NETWORK

FIELD OF THE INVENTION

The present invention relates generally to wireless communication systems, and, in particular, to mobile station and network management in a wireless communication system.

BACKGROUND OF THE INVENTION

The Open Mobile Alliance (OMA) standardizes messaging between a Device Management Server (DMS) and a mobile station (MS) to implement data collection and diagnostic procedures for managing a communication network. Such messaging can include, for example, over-the-air downloading or "flashing" of diagnostic (firmware) applications, network performance information that can be collected from the end users (MS) on perspective voice/data calls, and applications for active data testing by a client/server.

However, when an MS is establishing a call, any messaging from a DMS may interfere with this call. In particular, a message requesting data collection to or from the MS or providing firmware download/application installations to the MS can interfere with a user's call activity. For example, if an MS is installing a new firmware update, it may not be able to place or receive a call until it completely receives the update and reboots. In another example, if an MS is instructed to provide special diagnostic tests of the network, the MS might suffer some delays while canceling/aborting the current test mode if a new call needs to be established. This scenario could result in a communication link becoming clogged with high QoS test data which must be canceled at the source to avoid this test data competing with the new call establishment traffic.

A message containing a file transfer or requesting data collection by the MS can also result in a waste of communication capacity or MS battery life. For example, if an MS is collecting data for a diagnostic test for the network, and a call arrives, the MS may need to discard whatever data has already been collected, and collect that data at some other time, thereby wasting network capacity and battery life. Similarly, if a file is being transferred to the MS when a call is established this could degrade the call until the file transfer is completed or aborted.

Along the same lines, user activity can interfere with data collection and diagnostic messaging with the DMS. This can occur for example, if a diagnostic test requires that an MS participate or not participate in a call for a period of time. This can also occur if the diagnostic test requires the MS to move or stand still. This can also occur if the diagnostic test requires the MS handoff or not handoff.

Therefore, a need exists for a method and an apparatus that can maximize the number of diagnostic tests and timely firmware updates while minimizing inconvenience/degradation for users. It would also be of benefit to avoid having to wait for session/data transfer messages during a maintenance window when some users do not have connectivity.

Skilled artisans will appreciate that common but well-understood elements that are useful or necessary in a commercially feasible embodiment may not be depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present invention provides a method and an apparatus for network diagnostic management that maximizes the number of system updates (e.g. diagnostic tests and timely firmware updates) for a mobile station (MS) while minimizing inconvenience/degradation for users. Also, the present invention benefits network communications by avoiding having to wait for session/data transfer messages during a maintenance window when some users do not have connectivity. As described herein the diagnostic test can be related to fault detection reporting and/or network management requirements.

In particular, the present invention addresses: management of diagnostics policies, fault reporting by an MS, monitoring network performance by an MS, interrogating an MS for additional diagnostics data, downloading diagnostic procedures (application firmware or OMA DM client software) to an MS, invoking specific diagnostics procedures stored in the MS, invoking specific repairing procedures based on the results of diagnosis procedures, and updating a Trigger Authentication Shared Secret (TASS). However, it should be recognized that the present invention is applicable to all types of testing that can be performed by a mobile station. Any of the above messaging between a DMS and an MS is communicated using a Device Management protocol over a diagnostic interface, in what is defined herein as a Device Management session (DM session).

The present invention further defines the relevant interface requirements between a Device Management Server (DMS) and operator presence or other core entities to request status or availability information. The DMS described herein supports a mechanism that selectively detects changes to client usage probability based on presence information. Similarly, the device (i.e. mobile station MS) can support a mechanism that selectively detects changes to internal presence information in order to access usage probability to invoke specific diagnostic procedures. For example, as used herein the presence information can be the presence availability and/or calendar availability of the MS, but not information about its location. In this way, the presence information determination can be performed at the DMS or autonomously at the MS. In addition, the DMS can be interfaced through a communication path with external systems, e.g. Presence Server, or other entities to gather user activity and location information.

In practice, the present invention utilizes existing Presence information to determine when and how to implement a DM session (i.e. diagnostic test or a diagnostic firmware update to the OMA DM client). The presence information is used to predict when a mobile user might be establishing a call, which is then used by the present invention to avoid the implementation of a diagnostic test or a firmware update during those particular predicted times of call establishment. In practice, the DMS can use a policy, provisioned and distributed among its served mobile stations, that prompts a mobile station to perform specific diagnostic procedures (diagnostic tests or firmware updates for example) only if the presence information of the mobile station and/or its buddies meets certain criteria defined below, e.g. the MS can stop a diagnostic test or update if it determines a user has become available. The policies comprise an identification of the system operating parameters to be measured by the test mobile stations, instructions for assembling a report message that comprises the measured system operating parameter measurements, determined trigger events, associated operations results, and a destination address for a conveyance of the report message containing the measured system operating parameter measurements.

In particular, the Presence information can provide certain specific clues that a call might soon be established for the mobile station by, for example: a) the presence information shows a change or increase in the mobile station's available buddy list, wherein a mobile station is more likelihood to place or receive a call if one or more of its buddies suddenly become available, b) the presence information shows that a user is not currently in a meeting (e.g. from calendar information), wherein a mobile station is more likely to establish a call when a user is out of a scheduled meeting than when the user is in a scheduled meeting or is chairing a meeting, c) the mobile station projects that it will change its presence information from unavailable to available, wherein someone being notified of this change of state for a particular user may then take that opportunity to call that user's mobile station, especially if the user just started projecting availability and the user's buddies are powered on and therefore capable of receive that change of presence information, d) the presence information defines the period of time until the user is likely to began placing or receiving calls, wherein if a DM session can be completed within this period they may so proceed, and e) the presence information demonstrates that the mobile station may soon be performing handoffs or begin moving which would interrupt a DM session, wherein this information can be based on mobile's agenda or itinerary in its presence information. Currently none of these clues are being used to maximize the benefit of device management while minimizing battery, capacity, and user experience degradation.

If it is determined through presence information that one or more mobile station is available for a DM session (i.e. a call is not likely to be established soon), then the DMS can use its defined DM policy to invoke a DM session with the one or more MS. Alternatively, if the DM policy has been previously distributed by the DMS to its served MSs, then each MS can decide autonomously, based on its or its buddy's presence information, to complete a DM session. To limit the amount of reporting for a diagnostic test, the present invention can associate only particular MSs out of a plurality of MSs with the appropriate diagnostic test based on whether the test: requires a user to participate or not participate in a particular call type, and/or whether a mobile station exhibits or does not exhibit specific types of attributes, such as handoff/mobility.

Figure 1:
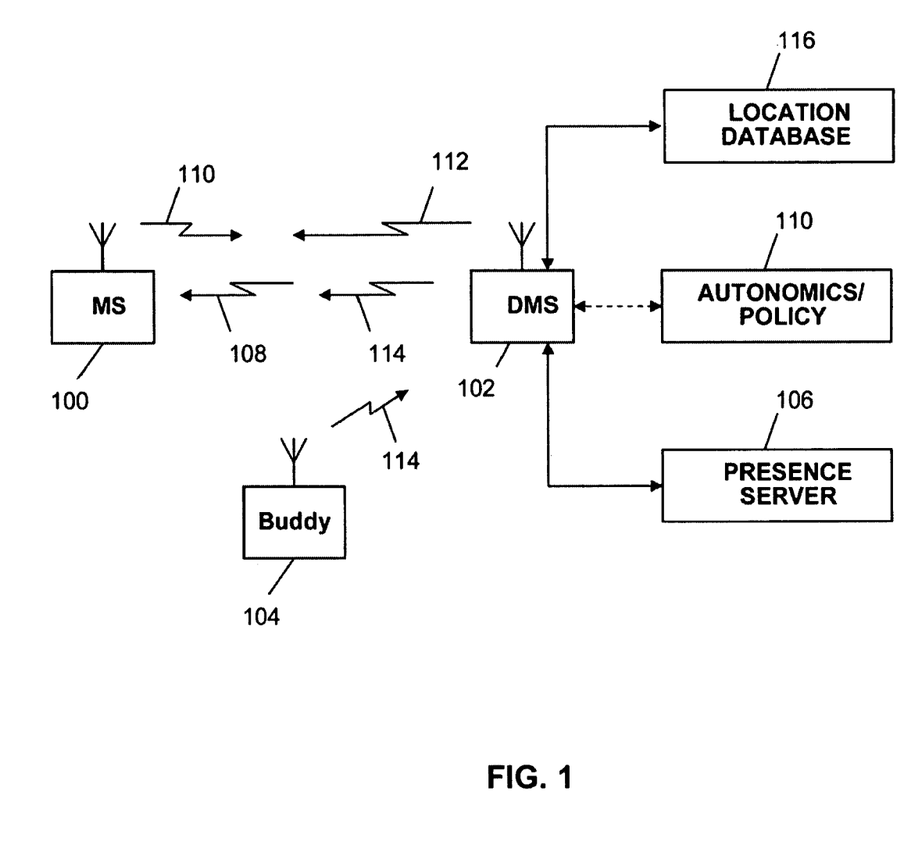
FIG. 1 is a block diagram of a wireless communication system in accordance with an embodiment of the present invention.

FIG. 1 is a block diagram of a wireless communication network, in accordance with the present invention. One or more mobile station 100, 104 are in a communication network served by a Device Management Server (DMS) 102. A Presence Server 106 can communicate presence information of the one or more mobile stations (MS) 100, 104 to the DMS 102. It should be recognized that the term MS used herein may also be referred to as user equipment, subscriber, mobile terminal, client device, and the like, as are known in the art, and that the MS resides in a location or coverage area, such as for example, a cell, a sector of a cell, or whatever is appropriate for the communication technology employed by communication system. The DMS 102 may be incorporated into an access node, such as a Base Station Transceiver or Node B, a Base Station Controller (BSC) or a Radio Network Controller (RNC), a Radio Access Network (RAN), a Wireless Local Area Network (WLAN) Access Point (AP), or separate network entity, that provides wireless communication services via an air interface to the at least one MS 100, 104.

An optional Autonomics/Policy database 110 can also be coupled to the DMS 102, and used in accordance with the second embodiment of the invention described below. The DMS 102 is operable to provide a Diagnostic Management (DM) policy 112 in a downlink to the one or more MS 100, 104, either distributed ahead of time or at the time of any needed DM session. The DM policy describes the DM sessions that can be performed by an MS having a particular attribute conducive for that session. The DMS can also supply presence information 114 of one or more buddies 104 in a downlink to the MS 100. In accordance with the policy, the MS 100 can then return the necessary diagnostics tests 110 in an uplink or perform firmware updates 108 in a downlink provided by the DMS 102, in accordance with the DM policy.

As should be recognized, the communication system includes further network elements known in the art but not shown for the sake of brevity. For example, the communication system can include an Internet Protocol (IP)-based core network, coupled to access network 110 and a network server, such as the Device Management and System Optimization Server (DMS) 102, coupled to the core network. The DMS 102 preferably comprises at least one processor, such as one or more microprocessors, microcontrollers, digital signal processors (DSPs), combinations thereof or such other devices known to those having ordinary skill in the art, and an associated memory device, such as random access memory (RAM), dynamic random access memory (DRAM), and/or read only memory (ROM) or equivalents thereof, that maintains DM rules and policies that may be executed by the corresponding processor, or sent to the MS for processing therein.

The DMS 102 and can be further coupled to a location and provisioning database 116, which stores an MS identifier associated with each MS active in the communication system, and maintains and tracks provisioning and mobility information with respect to each such MS, including registration of the MS when the MS activates in communication system and a most recent location of the MS. As is known in the art, the location and provisioning database 116 may be included in a Home Location Register (HLR) or a Visited Location Register (VLR), or a combination of an HLR and a VLR, or a Home Agent (HA) or a Foreign Agent (FA), or a combination of an HA and an FA.

The DMS 102, Presence Server 106, location and provisioning database 116 comprise network elements of the communication system, and are collectively referred to herein as a infrastructure of communication system. One of ordinary skill in the art realizes that the infrastructure may further include other network elements, such as one or more gateways, for example, a Packet Data Serving Node (PDSN) and/or a Broadcast Serving Node (BSN), or a Serving GPRS Support Node (SGSN) and a Gateway GPRS Support Node (GGSN), and one or more Operations and Maintenance Centers (OMCs), that are not depicted in FIG. 1 as FIG. 1 is provided merely to illustrate the principles of the present invention and is not intended to be an exclusive depiction of communication system.

Figure 2:
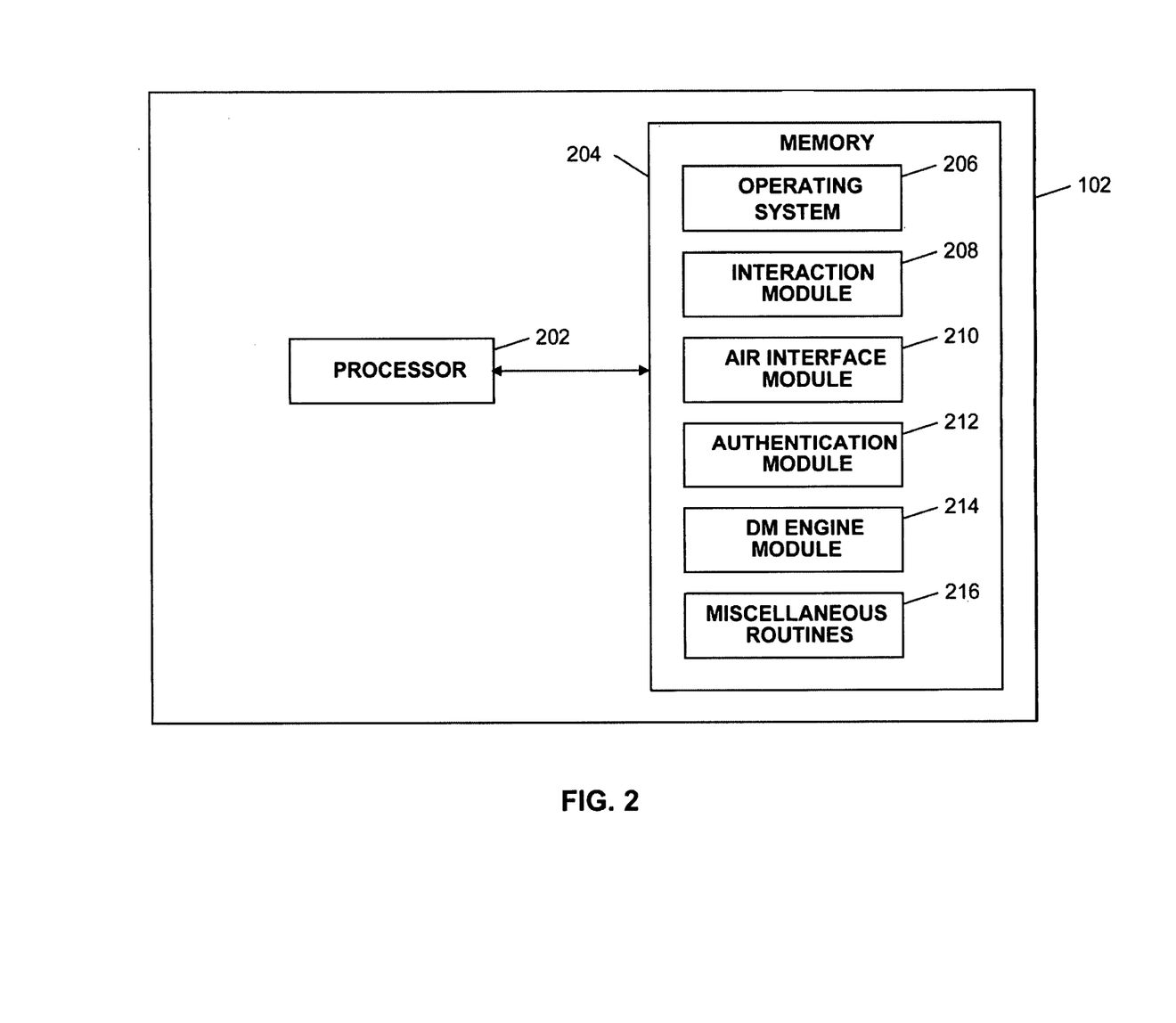
FIG. 2 is a block diagram of an architecture of a Device Management and System Optimization Server of FIG. 1 in accordance with another embodiment of the present invention.
Figure 3:
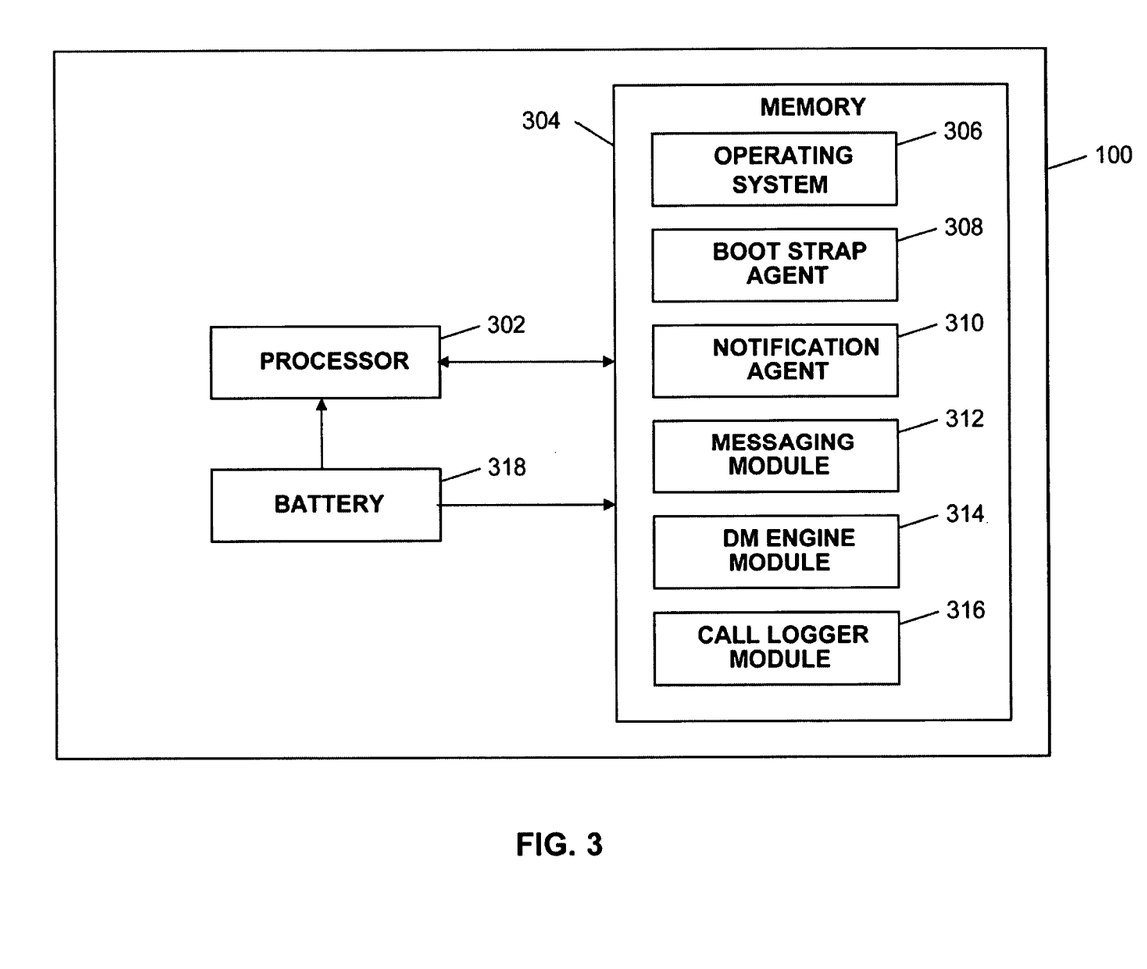
FIG. 3 is a block diagram of an architecture of a mobile station of FIG. 1 in accordance with an embodiment of the present invention.

Referring now to FIGS. 2 and 3, block diagrams are provided that illustrate the architectures of the DMS 102 and MS 100, respectively. The functionality depicted in FIG. 2 may reside in a single server, that is, DMS 102, wherein the functions of processor 202 of DMS 200 are performed by the software maintained in the memory device 204 of the DMS. As depicted in FIGS. 2 and 3, each of the DMS 102 and MS 100 includes a respective processor 202, 302, such as one or more microprocessors, microcontrollers, digital signal processors (DSPs), combinations thereof or such other devices known to those having ordinary skill in the art. Unless otherwise specified herein, the functions performed by each of DMS 102 and MS 100 are performed by their respective processors 202 and 302. The particular operations/functions of processors 202, 302, and respectively thus of DMS 102 and MS 100, are determined by an execution of software instructions and routines that are maintained in the respective memory devices 204, 304 associated with the processor, such as random access memory (RAM), dynamic random access memory (DRAM), and/or read only memory (ROM) or equivalents thereof, that maintain data and programs that may be executed by the corresponding processor.

Referring now to FIG. 2, the software maintained in the memory 204 of DMS 102 generally includes an operating system (OS) 206 comprising data and variables for providing overall control. Additionally, an interface or interaction module or routine 208 includes discovery and association functions and the like to support an ability to interface with MS 100 for exchanging messages according to a standard protocol for the developed features of a UMTS or CDMA-1X MS, including messaging related to monitoring network performance related to a quality of an experience of a user of a client device, such as MS 100, and end-to-end network testing. Further included is an air interface messaging module or routine 210 that supports initiation and/or notification of system performance monitoring and testing via unicast or broadcast messages sent to client devices and other messaging in support of system performance monitoring and testing. The software further includes an authentication module or routine 212 that support authentication via an exchange of credentials with the client devices. A DM engine module 214 includes a DMT Engine, an OMA DM client and associated interfaces, a DM agent, an OMA-DM (Open Mobile Alliance-Device Management) agent, and a Policy agent that is responsible for dictating the policies to the MS, such as a call logging model and a format and frequency of corresponding reports. Additional modules, or routines, 216, such as bindings over corresponding transport channels with respect to transport of bearer traffic and communication session success/failure notifications and session closure, may further be included in the memory device 204 as will be recognized by one of ordinary skill in the art.

The DMS 102 generally includes an operating system (OS) 206 comprising data and variables for providing overall control. In addition, the DMS includes DM applications that communicate with applications running on client devices serviced by the DMS, such as MS 100. In order to establish communications with client devices such as MS 100, the DMS 102 builds a Transport Control Protocol (TCP)/Internet Protocol (IP) tunnel through to the MS and can instruct the client devices to execute applications that perform system monitoring and testing, such as monitoring and testing voice quality, Push-to-Talk (PTT) data quality, latency, and throughput. The instructions may be conveyed to a selected or target set of client devices, as will be detailed below. The DMS 102 can accept client-based information, such as radio frequency (RF) loss reports, lost access attempts, cells or sectors unable to be accessed by the client devices, and regions of poor RF quality and, based on system parameter information received from the client devices, may build traffic distribution maps and path loss maps. The DMS can further broadcasts information, rules, policies, or applications to targeted clusters of client devices, such as a user group or talkgroup, for use before or after the client devices make their system parameter measurements.

Referring now to FIG. 3, the software maintained in at least one memory device 304 of MS 102 also generally includes an operating system (OS) 306 comprising data and variables for providing overall control. In addition, the software includes multiple modules or routines 308, 310, 312, 314, and 316. A Bootstrap agent 308 has the responsibility for exchanging required information with DMS 102 prior to any end-to-end performance testing and/or management session. A Notification agent 310 is responsible for notifications to initiate performance monitoring and/or end-to-end testing sessions. A Messaging module 312 that performs protocol binding for typical MS management sessions over considered bearers stack, for example, HTTP over TCP/IP or WAP. A DM engine module 314 includes a DMT Engine that performs the same function as in DMS 102 but extended for diagnostics, an OMA DM client and associated interfaces, a DM agent that performs the same function as in DMS 102 but extended for diagnostics, an OMA-DM (Open Mobile Alliance-Device Management) agent that performs the same function as in DMS 102 but extended for diagnostics, and a Policy agent that is responsible for respecting the policies dictated to the MS by DMS 102, such as a call logging model and a format and frequency of corresponding reports. A Call Logger 316 and a corresponding API (Application Program Interface) is an additional source for the DM Engine mechanism and facilitates a delivery of a corresponding report to a given call logging model and policy. MS 102 further includes a limited life power supply, typically a battery 318, that provides the power for the operation of the MS and its components of the MS.

The communication system can operate in accordance with any one of various standards such as CDMA (Code Division Multiple Access) and variants thereof, GSM (Global System for Mobile communications), GPRS (General Packet Radio System), TDMA (Time Division Multiple Access), FDMA (Frequency Division Multiple Access), any one of the IEEE (Institute of Electrical and Electronics Engineers) 802.xx standards, for example, the 802.11, 802.15, 802.16, or 802.20 standards, 3G systems such as UMTS (Universal Mobile Telecommunication Service) and CDMA 2000, or 4G systems such as OFDM (Orthogonal Frequency Division Multiple Access). By operating in accordance with well-known protocols, a user of MS 100 can be assured that MS 100 will be able to communicate with communication network and establish a packet data communication link with an external network via the communication network.

Figure 4:
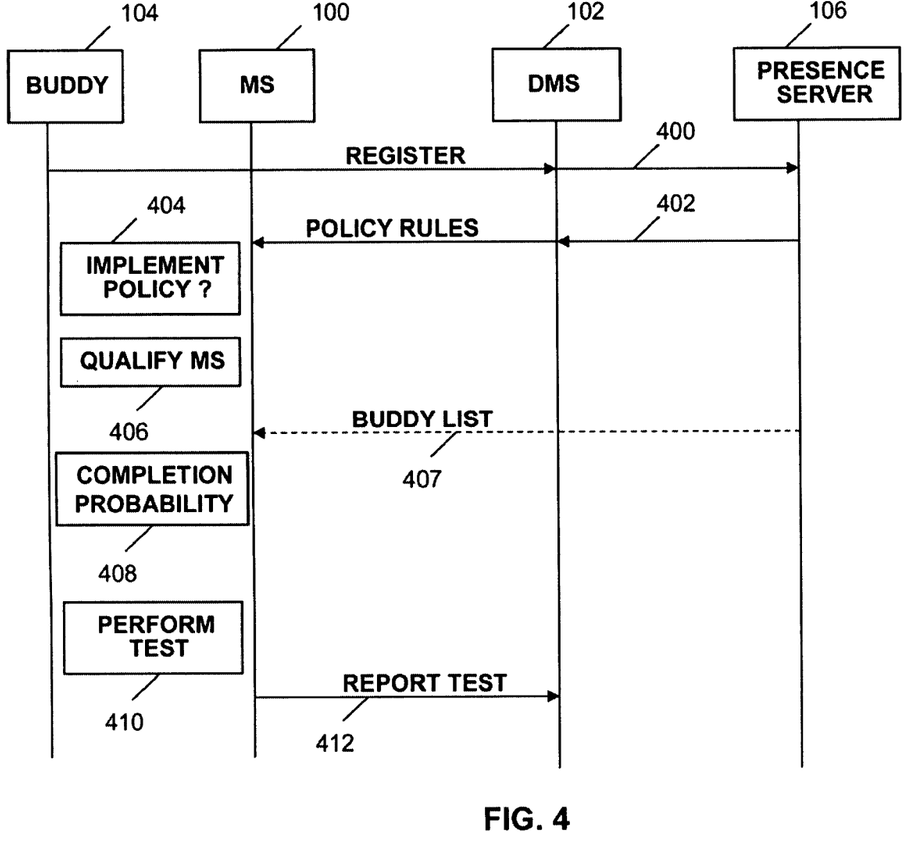
FIG. 4 is a logic flow diagram of a process executed by a communication system of FIG. 1 in managing diagnostic tests of a network by the mobile station of FIG. 3, in accordance with a first embodiment of the present invention.

In a first embodiment of the present invention, referring to FIG. 4, an MS-initiated DM session is performed. When an MS 100, 104 is activated, the MS registers 400 with the communication network in accordance with well-known registration techniques. As part of the registration procedure, a presence information of an activated MS 100, 104 is detected and stored in Presence Server 106. The DMS 102 obtains DM requirements from an autonomic business rules policy agent, which requires a Service Level Agreement (SLA) in the test area served by the DMS. The DMS can use existing XML Configuration Access Protocol (XCAP) with OMA Instant Messaging and Presence Service (OMA-IMPS) decoding to access the Presence Server 106. Preferably, the communication system publishes rules that can be automatically processed by the DMS. Rules are expressed in XML, and are associated with a set of published presence information.

In the prior art, only when an MS is in a maintenance window of time would the MS periodically performs diagnostic tests, such as monitoring a strength of pilot channels associated with nearby BSSs or RANs, and report these diagnostic tests back to the DMS 102 serving the MS. However, the present invention provides a technique to incorporate diagnostic testing at any time (i.e. outside of maintenance windows), thereby improving system operating efficiency. In particular, the present invention provides for a managing of MSs wherein the MSs are embedded with policies that selectively instruct the MS to monitor, measure, and report particular system parameter measurements, determined trigger events, associated operations results, and can further instruct the MS as to the conditions under which to monitor, measure, and report the system parameter measurements, given its particular attributes. In addition, the present invention provides for an end-to-end messaging with respect to the instructing and reporting, thereby permitting network elements that are best able to perform system optimization, such as DMS 102, to control the monitoring, measuring, and reporting by the MSs.

This first embodiment is only applicable to the situation where the MS supplies diagnostic test reports in a DM session to the DMS, since DM sessions regarding downloads from the DMS typically involve DMS initiation. In order for an MS to autonomously initiate any action, the MS must have previously received 402 policy rules from the DMS in its coverage area, and recognize that it is in this known coverage area where system test policy rules should be implemented 404 (i.e. match the current location cell list with required policy test). The MS will then qualify itself 406, knowing its presence information. For example, the presence information of an MS can show; a) that it is available to perform and report diagnostic test (i.e. the phone is on and not in a call), b) that it is available and not currently in meeting, and c) that it has the resource capability (i.e. good signal and battery level) and attributes to complete the diagnostic test and report, which can also depend on the operational network (GPRS/UMTS/HSDPA).

The MS will then estimate 408 the usage probability of the MS, i.e. the probability that the MS can successfully implement the diagnostic test and report it to the DMS. As previously described, this usage probability estimate relies on various clues including: the immobility or length of time, T, that the MS has been in the current cell (where 5-10 seconds within one cell is considered good for completion of the diagnostic); the probability, M, that the user will be in a meeting and how active they will be in the meeting; and the present status, S, of the mobile station (i.e. client-defined availability of the MS). These parameters can then be used to determine the probability, X, that the MS will successfully completing the diagnostic test and reporting it to the DMS, as follows:

$$X=T(1\text{ or }0)+M(\text{User \% active})+S(1\text{ or }0) \qquad (\text{Eq. 1})$$

Of course, it should be realized that other or further weightings could be used. For example, an optional parameter that can be considered is the availability of units, B, on the active buddy list of the MS provided 407 by the Presence Server 106. The Presence Server knows the buddy list of the MS since it knows for whom the MS has subscribed to receive presence updates. If more units become active on the buddy list, increasing the chance of receiving an interrupting call therefrom, then the probability of successfully complete the diagnostic test and report it to the DMS is correspondingly reduced, such as:

$$X=T(1\text{ or }0)+M(\text{User \% active})+S(1\text{ or }0)-B(\#\text{active}) \qquad (\text{Eq. 2})$$

The MS can then compare the probability, X, against a learned DM session completion success rate metric. The learned diagnostic completion success rate metric is empirically determined by the DMS and previously provided to the MS. If it is determined from the above that the MS is qualified to do the diagnostic test, and the probability is higher than the learned metric, then the MS will proceed 410 with the diagnostic test and report 412 the results to the DMS.

The learned success rate metric balances the need to obtain test reports against the known interruption of service to users from these tests. In particular, this metric is compiled from a statistical history and weighting of user state transitions to predict upload/download file size and/or time versus a known time when the MS should not be disturbed, i.e. shut off for lunch time, meeting time, exercise time, etc. This metric compares the ability to run a diagnostic test successfully versus having a test interrupted by a mobile station going active/inactive or changing cells. The DMS raises or lowers this metric until an acceptable success rate for test or reporting is achieved. The DMS initializes and stores the metric weights and provides the metric to the MS as needed for testing. The reporting success rate and mobile population is tracked in order to adjust the amount of mobiles needed for test reports so that the amount of data required still arrives quickly enough for the business policy rules, e.g. need 100 measurement in the next 10 minutes to verify antenna pathloss functionality on a cell.

Figure 5:
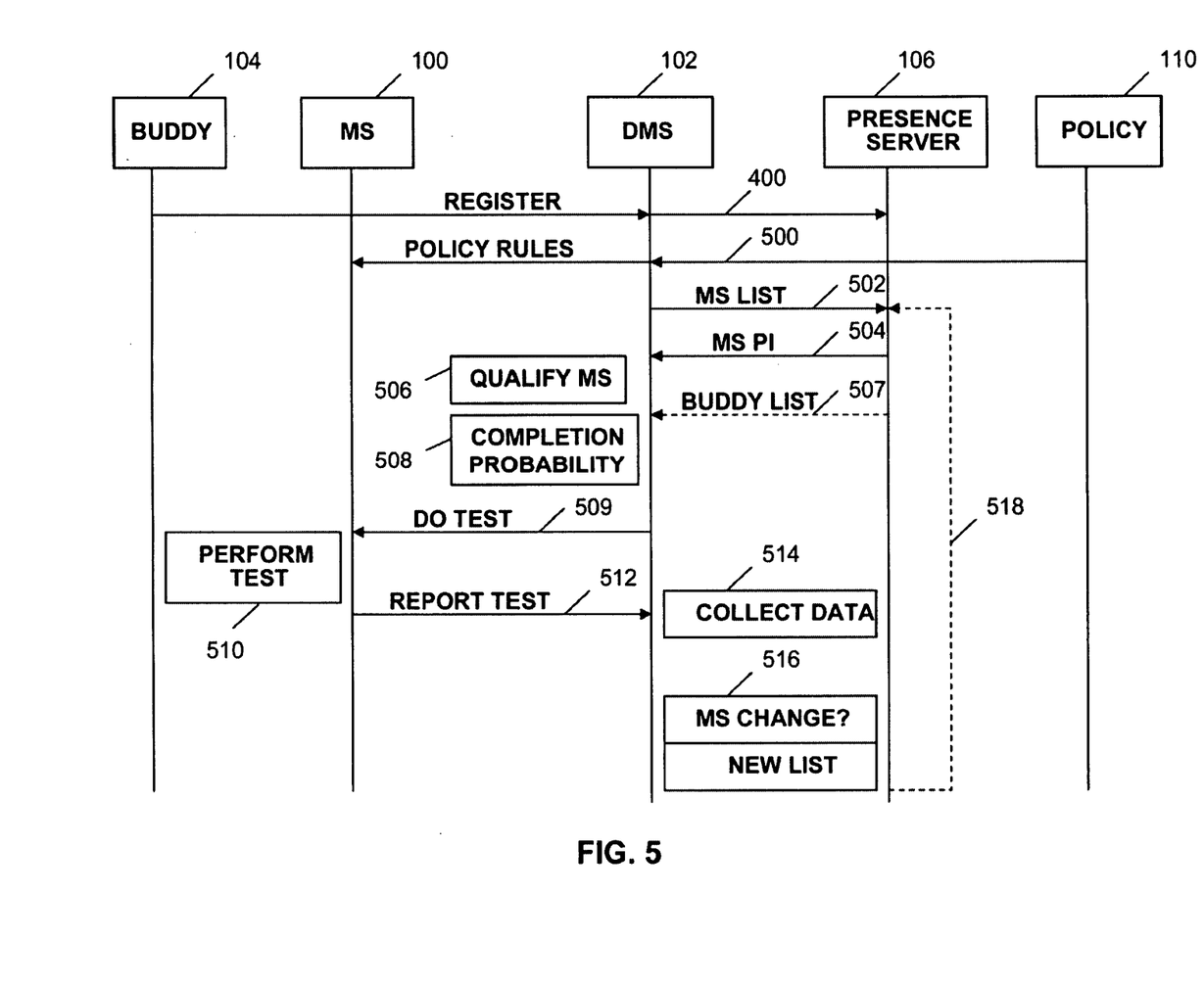
FIG. 5 is a logic flow diagram of a process executed by a communication system of FIG. 1 in managing diagnostic tests of a network by the DMS of FIG. 2, in accordance with a second embodiment of the present invention.

In a second embodiment of the present invention, referring to FIG. 5, a DMS-initiated DM session is performed. Any active MS 100, 104 registers 400 with the DMS 102 and Presence Server 106 as before. Also, the DMS 102 obtains 500 DM requirements from an autonomic business rules policy agent 110 as before. The DMS 102 provides 502 a list of active mobile stations it is serving, along with the scope of tests required by the policy rules, to the Presence Server 106. The Presence Server then provides 504 the presence information (PI) of any active mobile on the list and their attributes (e.g. which MS might be preferred to do a particular diagnostic task). The DMS will then qualify 506 its mobile stations knowing their presence information. For example, the presence information of an MS can show; a) that it is available to implement a DM session (i.e. the phone is on and not in a call), b) that it is available and not currently in meeting, and c) that it has the resource capability (i.e. good signal) and attributes to implement the DM session, which can also depend on the operational network (GPRS/UMTS/HSDPA).

The DMS will estimate 508 the completion probability of the MSs according to their usage probability, i.e. the probability that the MSs can successfully implement the DM session. The DMS will also weight and sort any qualified users according to the usage probability, dropping any poorly qualified users. As previously described, each usage probability estimate relies on various clues including: the immobility or length of time, T, that the MS has been in the current cell (where 5-10 seconds within one cell is considered good for completion of a diagnostic test); the probability, M, that the user will be in a meeting and how active they will be in the meeting; and the present status, S, of the mobile station (i.e. client-defined availability of the MS). These parameters can then be used to determine the probability, X, that each MS will successfully implement the DM session using Eq. 1 or Eq. 2 as before.

Also as before, it should be realized that other or further weightings could be used. For example, an optional parameter that can be considered is the availability of units, B, on the active buddy list of the MS provided 507 by the Presence Server 106. If more units become active on the buddy list, increasing the chance of receiving an interrupting call therefrom, then the probability of successfully implementing the DM session is correspondingly reduced. Alternatively, if any of the units 104 on the buddy list area available to implement the DM session other than the MS 100, and can be directed to do so by the DMS, then the probability of successfully implementing the DM session by any MS 100, 104 is correspondingly increased.

The DMS can then compare the probability, X, for each MS against a learned diagnostic completion success rate metric. The learned diagnostic completion success rate metric is empirically determined by the DMS as previously described. Those mobile stations qualified to do the diagnostic test, and having a weighted probability higher than the learned metric, are directed 509 by the DMS to implement the DM session, e.g. proceed 510 with a diagnostic test and report 512 the test results back to the DMS.

The DMS then collects 514 data until the business policy and/or data validation is complete. If there is any change 516 in status (e.g. the presence information, or which DM application is being used) of the MSs, the DMS can send a new monitor list to the Presence Server 106 for updating by repeating 518 the above steps 502-514.

Figure 6:
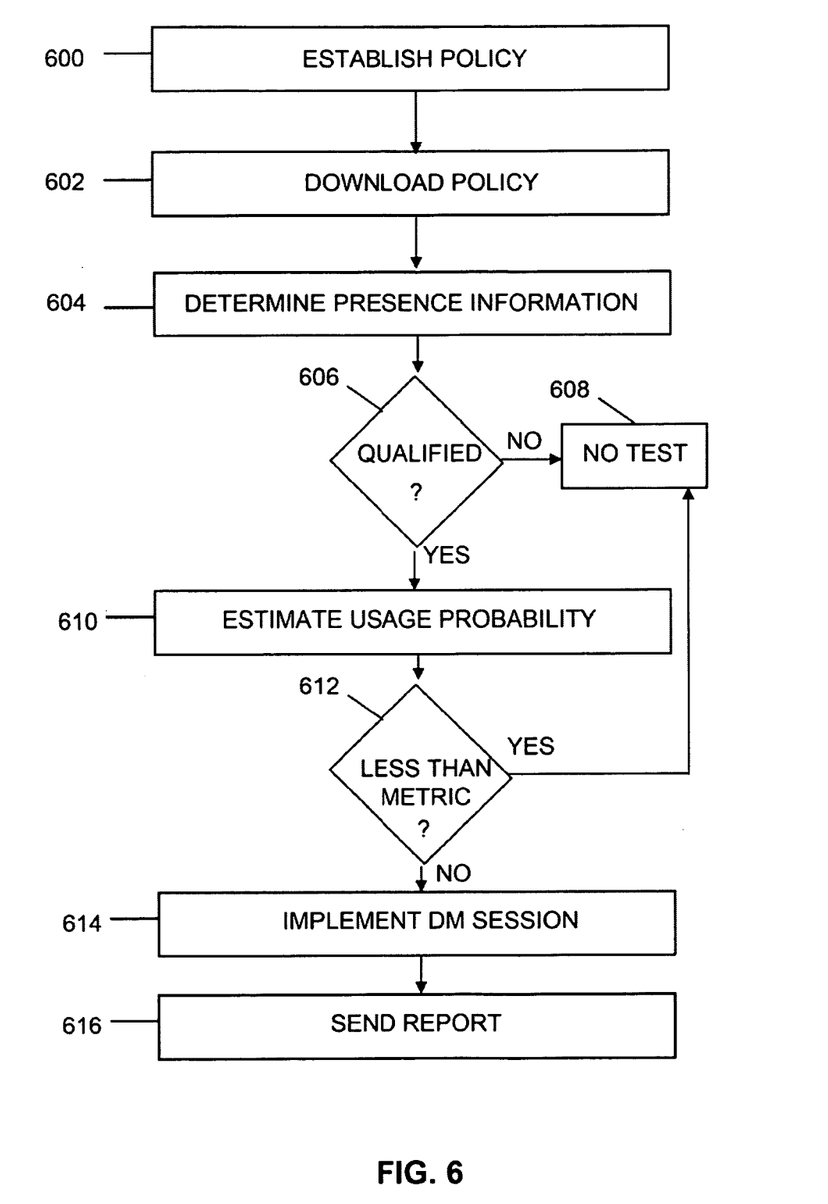
FIG. 6 is a flow chart of a method, in accordance with the present invention.

Referring now to FIG. 6, a logic flow diagram is provided that illustrates a method for managing diagnostic sessions in a communication network, in accordance with various embodiments of the present invention. Logic flow diagram begins by establishing 600 a diagnostic policy that defines diagnostic procedures to be performed in a DM session by a mobile station in response to presence information of that mobile station.

A next step 602 includes downloading the policy to the at least one mobile station in a DM session. The provisioning of the system operating parameter measurement and report policy may occur prior to, contemporaneous with, or subsequent to the selection of the MS that will implement the policy. For example, in one embodiment of the invention, DMS can report policies to each MS residing in the coverage area. The provisioned policies may then include instructions to execute the policies. In addition, the DMS can query the Presence Server and/or location database to identify MSs that are actually located in a coverage area where the DMS wants to perform a diagnostic test. The DMS can then convey the system parameter measurement and report policies to each identified MS via a broadcast channel or a forward link signaling channel of an air interface associated with the coverage area. For example, DMS can convey a Short Message Service (SMS) message to each such MS instructing the MS to monitor a signaling channel or a common channel, such as a broadcast channel, wherein the DMS can then convey the policies over the monitored channel. Alternatively, the DMS can determine which MSs are currently actively engaged in a communication session in a coverage area desired to be tested, for example, are currently assigned a traffic channel in the coverage area. The DMS can then convey the system parameter measurement and report policies to each such MS via the assigned forward link traffic channel or via a forward link signaling channel. By requesting reporting from an MS that is currently engaged in a call, the communication system could take advantage of a reporting of data that may already be collected and stored by such an MS.

A next step 604 includes determining presence information of at least one active mobile station in a coverage area of a Diagnostic Management Server (DMS).

A next step 606 includes qualifying the at least one active mobile station for implementation of a DM session, based on the presence information. If the at least one mobile station is not qualified then there is no diagnostic test 608.

A next step 610 includes estimating a usage probability of the at least one active mobile station based on the presence information.

A next step 612 includes comparing the usage probability for each mobile station against a statistical history metric of DM session completion success rate for that mobile station. If the probability is less than the metric then there is no diagnostic test 608.

A next step 614 includes implementing a Diagnostic Management (DM) session in response to the usage probability and attributes of the at least one active mobile station. In this step, the DM session comprises diagnostic procedures of the policy that instruct a selected mobile station to: measure identified system operating parameters, assemble a report message that comprises the system operating parameter measurements, determined trigger events, and associated operations reports, and send the report message to the DMS. The system operating parameter measurement and report policies comprise criteria that may be used by each test MS to determine what system operating parameters to measure and when to measure and report such parameters, and can include a destination address, such as a routing address associated with DMS, for a conveyance of the report. Alternatively, the DM session comprises a download of a diagnostic application or policy procedures. Preferably, the at least one mobile station consists of a mobile station and its associated buddy list of mobile stations, wherein this step can be performed by any of the mobile stations.

A next step 616 includes the MS sending the report such that the DMS receives the system operating parameter measurement reports comprising system operating parameter measurements made by the MS and information concerning a location of the MS. Based on the received system operating parameter measurement reports, DMS may issue an alert, preferably alerting an operator of communication system to a system condition that is detected based on the received measurements and location information, such as a sleeping cell or a coverage hole. Alternatively, the DMS can take corrective action in an attempt to remedy the detected condition. For example, in the event that a sleeping cell is detected, the DMS may attempt to wake up the cell. By way of another example, in the event that a coverage hole is detected, the DMS may request that surrounding cells increase their transmit power. By way of yet another example, when the DMS determines that a configuration change at an access network has resulted in diminished system performance, the DMS may instruct the access network to revert to a previous configuration.

By providing for a provisioning of system operating parameter measurement and report policies to test MSs that are either selected by a network server or that reside in a coverage area where testing is desired, the communication system permits an autonomic, dynamic, and selective testing of system operating conditions and configuration changes. The policies may be provisioned only to the test MSs, or the policies may be provisioned to all MSs operating in communication system and then only the test MSs are instructed by the network server to execute the provisioned policies. Criteria concerning the conditions for implementing the policies can be included in the policies themselves, for autonomous implementation by an MSs, or the DMS may instruct specific MSs to execute the provisioned policies.

Advantageously, the present invention increases the ability to update mobile firmware and gather system test/field data without significant user experience degradation and resource/battery waste. The present invention increases the speed of firmware updates, as users are not just updated during maintenance windows, but may be done anytime during the day, thereby improving the speed of data collection from users for system performance—allowing correction of network outages in real time.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for managing diagnostic sessions in a communication network, the method comprising the steps of:
   determining presence information of at least one mobile station and other mobile stations on its associated buddy list of mobile stations;
   estimating a usage probability of the at least one mobile station based on the presence information of the at least one mobile station and the other mobile stations on its associated buddy list of mobile stations, the usage probability being the probability that the at least one mobile station will successfully complete a diagnostic procedure in a Diagnostic Management session; and
   implementing the Diagnostic Management session in response to the usage probability.

2. The method of claim 1, further comprising the step of qualifying the at least one mobile station for implementation of a Diagnostic Management session, based on the presence information.

3. The method of claim 1, further comprising the step of comparing the usage probability against a statistical history metric of Diagnostic Management session completion success rate for that mobile station.

4. The method of claim 1, further comprising the step of establishing a diagnostic policy that defines diagnostic procedures to be performed in the Diagnostic Management session by the at least one mobile station in response to at least one of presence availability and calendar availability for that mobile station.

5. The method of claim 4, further comprising the step of downloading the policy to the at least one mobile station in a Diagnostic Management session.

6. The method of claim 4, wherein the diagnostic procedures instruct a mobile station to: measure identified system operating parameters, assemble a report message that comprises the measured system operating parameters, and send the report message to a Diagnostic Management Server.

7. The method of claim 6, wherein the report message includes system parameter measurements, determined trigger events, and associated operations results in an Open Mobile Alliance Diagnostic Management data model.

8. The method of claim 1, the at least one mobile station or other mobile stations on the associated buddy list of mobile stations based on their respective usage probability.

9. A method for managing diagnostic sessions in a communication network, the method comprising the steps of:
   establishing a diagnostic policy that defines diagnostic procedures to be performed in a Diagnostic Management session by a mobile station in response to presence availability and calendar availability for that mobile station;
   determining presence information of at least one active mobile station in a coverage area of a Diagnostic Management Server;

determining presence information of other mobile stations on a buddy list of mobile stations associated with the at least one active mobile station;

qualifying the at least one active mobile station for implementation of a Diagnostic Management session, based on the presence information of the at least one active mobile station and the other mobile stations on its associated buddy list of mobile stations;

estimating a usage probability of the at least one active mobile station based on the presence information of the at least one active mobile station and the other mobile stations on its associated buddy list of mobile stations, the usage probability being the probability that the at least one mobile station will successfully complete the diagnostic procedures in the Diagnostic Management session;

comparing the usage probability for each mobile station against a statistical history metric of Diagnostic Management session completion success rate for that mobile station; and implementing a Diagnostic Management session in response to the usage probability and attributes of the at least one active mobile station.

10. The method of claim 9, further comprising the step of downloading the policy to the at least one mobile station in a Diagnostic Management session.

11. The method of claim 9, wherein the diagnostic procedures instruct a mobile station to: measure identified system operating parameters, assemble a report message that comprises the measured system operating parameters, and send the report message to the Diagnostic Management Server.

12. The method of claim 11, wherein the report message includes system parameter measurements, determined trigger events, and associated operations results in an Open Mobile Alliance Diagnostic Management data model.

13. The method of claim 9, wherein the implementing step is performed by the at least one active mobile station or other mobile stations on the associated buddy list of mobile stations based on their respective usage probability.

14. A system for managing diagnostic sessions in a communication network, the system comprising:

at least one mobile station and presence information associated therewith; and at least one other mobile station on an associated buddy list of the at least one mobile station, the at least one mobile station having a usage probability estimated based on the presence information of the at least one mobile station and the other mobile stations on its associated buddy list of mobile stations, the usage probability being the probability that the at least one mobile station will successfully complete a diagnostic procedure in a Diagnostic Management session, and wherein the at least one mobile station is operable to implement the Diagnostic Management session in response to the usage probability.

15. The system of claim 14, wherein the at least one mobile station is operable to qualify its implementation of a Diagnostic Management session, based on the presence information.

16. The system of claim 14, wherein the at least one mobile station includes an Open Mobile Alliance Diagnostic Management client and associated interfaces.

17. The system of claim 14, wherein the at least one mobile station is operable to compare the usage probability against a statistical history metric of Diagnostic Management session completion success rate for that mobile station.

18. The system of claim 14, further comprising a diagnostic policy that defines diagnostic procedures to be performed in the Diagnostic Management session by the at least one mobile station in response to at least one of presence availability and calendar availability for that mobile station, wherein the at least one mobile station performs the diagnostic procedures and provides a report about the results of the diagnostic procedures.

19. The system of claim 18, further comprising a Device Management Server operable to download the policy to the at least one mobile station in a Diagnostic Management session.

20. The system of claim 19, wherein the Diagnostic Management Server includes an Open Mobile Alliance Diagnostic Management client and associated interfaces.

21. The system of claim 18, wherein the diagnostic procedures instruct a mobile station to: measure identified system operating parameters, assemble a report message that comprises the measured system operating parameters, and send the report message to the Diagnostic Management Server.

22. The system of claim 21, wherein the report message includes system parameter measurements, determined trigger events, and associated operations results in an Open Mobile Alliance Diagnostic Management data model.

23. The system of claim 14, the at least one mobile station or other mobile stations on the associated buddy list, based on their respective usage probability, implements the Diagnostic Management session.

24. The system of claim 19, wherein the Diagnostic Management Server is operable to determine the presence information for the at least one mobile device, estimate the at least one mobile station usage probability based on the presence information, and direct the at least one mobile station to perform diagnostic procedures in accordance with the policy.

* * * * *

UNITED STATES PATENT AND TRADEMARK OFFICE
CERTIFICATE OF CORRECTION

| | | |
|---|---|---|
| PATENT NO. | : 8,700,028 B2 | Page 1 of 1 |
| APPLICATION NO. | : 12/372974 | |
| DATED | : April 15, 2014 | |
| INVENTOR(S) | : John M. Harris et al. | |

It is certified that error appears in the above-identified patent and that said Letters Patent is hereby corrected as shown below:

IN THE SPECIFICATION:

In Column 6, Line 25, delete "MS 102" and insert -- MS 100 --, therefor.

In Column 6, Line 50, delete "MS 102" and insert -- MS 100 --, therefor.

In Column 8, Line 6, delete "X=T(1 or O)+M(User % active)+S(1 or O)" and insert -- "X = T(1 or 0) + M(User % active) + S(1 or 0). --, therefor.

In Column 8, Line 19, delete "X=T(1 or 0)+M(User % active)+S(1 or 0)-B(#active)" and insert -- X = T(1 or 0) + M(User % active) + S(1 or 0) - B(#active) --, therefor.

IN THE CLAIMS:

In Column 12, Line 56, in Claim 8, delete "the at" and insert -- wherein the implementing step is performed by the at --, therefor.

In Column 14, Line 40, in Claim 23, delete "the at" and insert -- wherein the at --, therefor.

Signed and Sealed this
Nineteenth Day of April, 2016

Michelle K. Lee
*Director of the United States Patent and Trademark Office*